United States Patent Office 3,082,256
Patented Mar. 19, 1963

3,082,256
PREPARATION OF PHOSPHINE
OXIDE COMPOUNDS
Harold James Harwood and Kenneth A. Pollart, Dayton, Ohio, assignors to Monsanto Chemical Company, St. Louis, Mo., a corporation of Delaware
No Drawing. Filed July 20, 1959, Ser. No. 828,042
3 Claims. (Cl. 260—606.5)

The present invention relates to the preparation of organic compounds of phosphorus and more particularly provides a new and valuable method of preparing phosphine oxide compounds of the formula

in which R is a hydrocarbyl radical free of aliphatic unsaturation and containing from 1 to 8 carbon atoms and R' and R" are selected from the class consisting of R and chlorine.

We have found that compounds of the above formula are readily prepared by treating the corresponding phosphorus-sulfur compounds with thionyl chloride or bromide, the reaction occurring substantially according to the scheme

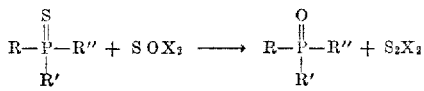

wherein R, R' and R" are as herein defined and X is chlorine or bromine.

One class of phosphorus-sulfur compounds having the above formula and useful for the present purpose includes the trihydrocarbylphosphine sulfides. Conversion thereof to the trihydrocarbylphosphine oxides proceeds according to the following equation.

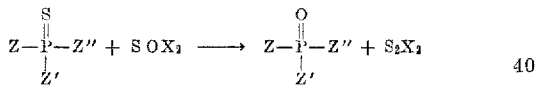

where Z is a hydrocarbyl radical free of aliphatic unsaturation and containing from 1 to 8 carbon atoms.

A particularly valuable group of phosphine oxides having the above formula and prepared according to the invention are the simple trialkylphosphine oxides, e.g., the trimethyl-, triethyl-, tripropyl-, triisopropyl-, tributyl-, tripentyl-, trihexyl-, triheptyl-, tris(2-ethylhexyl)-, and trioctylphosphine oxide. Also obtained by the present process are, for example, the following trihydrocarbylphosphine oxides where Z, Z' and Z" are the hydrocarbyl radicals shown below:

| Z | Z' | Z" |
|---|----|----|
| Phenyl | Phenyl | Phenyl |
| Ethyl | Ethyl | Methyl |
| Methyl | Methyl | Phenyl |
| Cyclohexyl | Cyclohexyl | Cyclohexyl |
| Benzyl | Benzyl | Benzyl |
| 4-tolyl | 4-tolyl | 4-tolyl |
| 2-ethylhexyl | 2-ethylhexyl | Methyl |
| Benzyl | Ethyl | Ethyl |
| 4-isopropylphenyl | Butyl | Butyl |
| Octyl | Phenyl | Phenyl |
| 2-ethylbenzyl | 2-ethylbenzyl | 2-ethylbenzyl |
| Cyclopropyl | Cyclopropyl | Cyclopropyl |
| Isobutyl | Octyl | Octyl |
| Pentyl | Pentyl | 2-methylcyclopentyl |
| Phenyl | Cyclohexyl | Cyclohexyl |
| Xylyl | Xylyl | Xylyl |
| Methyl | Ethyl | Phenyl |
| Hexyl | Hexyl | Ethyl |

The mixed trihydrocarbylphosphine sulfides which may be used to prepare the corresponding trihydrocarbylphosphine oxides according to the invention are readily obtained, e.g., according to the process of our copending application Serial No. 828,044, filed July 20, 1959, wherein dihydrocarbylphosphinothioic halides are reacted with a hydrocarbylmagnesium halide to give the trihydrocarbylphosphine sulfides.

Dihydrocarbylphosphinothioic chlorides are likewise converted, according to the invention, to give the corresponding oxygen compounds. Thus:

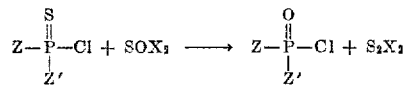

The dialkylphosphinothioic chlorides are thus converted to the dialkylphosphinic chlorides and the diarylphosphinothioic chlorides are converted to the diarylphosphinic chlorides. Examples of dihydrocarbylphosphinic chloride prepared from the corresponding phosphinothioic chlorides according to the present process are shown below:

| Z = | Z' = |
|-----|------|
| Ethyl | Ethyl |
| Methyl | Methyl |
| Isopropyl | Isopropyl |
| Butyl | Butyl |
| Pentyl | Pentyl |
| Hexyl | Hexyl |
| Heptyl | Heptyl |
| 2-ethylhexyl | 2-ethylhexyl |
| Octyl | Octyl |
| Methyl | Ethyl |
| Isopropyl | Butyl |
| 2-ethylhexyl | Ethyl |
| Phenyl | Phenyl |
| Phenyl | Methyl |
| 4-tolyl | 4-tolyl |
| 4-ethylphenyl | 4-ethylphenyl |
| Benzyl | Benzyl |
| Benzyl | Ethyl |
| Cyclopentyl | Cyclopentyl |
| Cyclohexyl | Cyclohexyl |
| Phenyl | Isopropyl |
| Benzyl | Phenyl |
| Cyclopropyl | Cyclopropyl |
| 2-phenylethyl | 2-phenylethyl |
| Ethyl | 4-ethylbenzyl |
| Cyclohexyl | Pentyl |
| Methyl | 2-methylcyclopentyl |

In prior art, the dihydrocarbylphosphinic halides have been obtainable only with difficulty and in low yields. Thus, as reported by H. Jean et al., Bull. Soc. Chim. France (1956), 569–70, from the mixture of reaction products obtained from either methylmagnesium chloride or ethylmagnesium chloride there is obtained upon dry vacuum distillation only a 10% yield of the dimethylphosphinic chloride or the diethylphosphinic chloride. The compounds $RPOCl_2$ or $R_2POCl$ (where R is methyl or ethyl) are said to remain strongly complexed with magnesium and can only be partially separated by using ether as a solvent. When methylmagnesium bromide was used instead of the corresponding chloride, the products contained bromine.

As will be shown hereinafter, the present process gives the dihydrocarbylphosphinic halides in very good yields. The starting materials, i.e., the phosphinothioic halides, are readily obtained by chlorination of the tetrahydrocarbyl bi(phosphine sulfides) which, as reported by Reinhardt et al., Chem. Berichte 90, 1656 (1957), are readily prepared by the reaction of thiophosphoryl chloride with a hydrocarbylmagnesium bromide.

The present invention also provides a method of preparing hydrocarbylphosphonic dichlorides from the corresponding phosphonothioic dichlorides, thus:

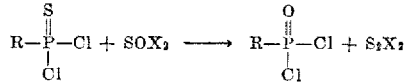

Reaction of thionyl chloride or bromide with methylphosphonothioic dichloride thus gives methylphosphonic dichloride,

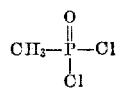

Other hydrocarbylphosphonic dihalides prepared according to the invention are ethyl-, propyl-, butyl-, isopropyl-, pentyl-, hexyl-, heptyl-, 2-ethylhexyl-, octyl-, phenyl-, 2-, 3-, or 4-tolyl-, benzyl-, 2-phenylethyl-, 2-, 3-, or 4-ethylphenyl-, cyclopropyl-, cyclopentyl-, cyclohexyl, and the xylylphosphonic dichlorides.

Reaction of the trihydrocarbylphosphine sulfides, the dihydrocarbyl phosphinothioic chlorides or the hydrocarbyl phosphonothioic chlorides with thionyl chloride or bromide to give the corresponding oxygen compounds takes place readily at ordinary, elevated, or reduced temperatures, depending upon the nature of the individual phosphorus-sulfur compound and of the thionyl halide. Using the quite reactive trihydrocarbylphosphine sulfides, reaction usually occurs without application of heat; in some instances an exothermic reaction occurs. When employing such compounds it is preferred to operate by adding the thionyl halide to the sulfide gradually at ordinary or decreased temperatures, for instance, at a temperature of from 0° to 20° C. Heating at, for instance, from 50° to 125° C. and preferably at the refluxing temperature of the reaction mixture may be necessary when working with the less reactive phosphinothioic halides or phosphonothioic dihalides. It is generally advantageous to operate in the presence of an inert liquid diluent or solvent, e.g., benzene, toluene, hexane, dichlorobenzene, etc. The phosphorus-sulfur compound and the thionyl halide are advantageously employed in stoichiometric proportions, i.e., one mole of the sulfur compounds per mole of the thionyl halide. However, an excess of the thionyl halide may be used and is often recommended to assure complete participation in the reaction of the less readily available compound. Completion of the reaction can be generally ascertained by noting cessation in change of color and viscosity of the reaction mixture. The products, i.e., the phosphine oxides, the phosphinic halides, or the phosphonic halides are easily isolated from the reaction products by simply removing the diluent and any excess of reactants which may have been employed.

As is known in the art, trihydrocarbylphosphine oxides are readily halogenated to dihalotrihydrocarbylphosphoranes. In some instances, sulfur monochloride formed as by-product in the conversion of the sulfides to oxides or excess thionyl halide will react with the oxides, thus:

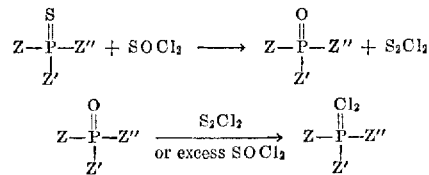

where Z, Z' and Z'' are hydrocarbyl radicals.

While extent of halogenation will depend upon the nature of the individual phosphine oxide, and upon the reaction conditions employed, conversion of any or all of the oxide product into the dihalide is immaterial for the present purpose, since the dihalide, is formed, is readily converted to the phosphine oxide by mixing with water, thus:

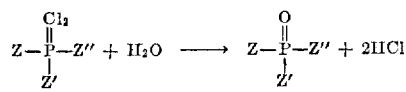

Of course, if desired, the dihalotrihydrocarbylphosphorane can be isolated and used per se, e.g., as an intermediate for the preparation of dialkylphosphinous chlorides by pyrolysis.

The invention is further illustrated by, but not limited to, the following examples.

*Example 1*

Thionyl chloride (0.034 mole) was added to a stirred solution of triphenylphosphine sulfide (0.034 mole) in 100 ml. anhydrous benzene at room temperature. A very mild reaction appeared to take place and after a few minutes a small amount of heavy oil separated. The pale yellow liquid was decanted from the heavy oil, and the solvent and low boiling components removed under water pump vacuum with a minimum amount of heating. The yellow solid which remained washed with warm water to remove any acidic chloro compounds (titration of the wash water showed it to contain 0.003 mole of HCl). The solid was then recrystallized from dilute alcohol, to give the triphenyl phosphine oxide, M.P. 158°, mixed M.P. with authentic compound 157-8°.

*Example 2*

A solution of 6.33 g. (0.372 mole) of dimethylphenylphosphine sulfide in 35 ml. of benzene was chilled in an ice-bath and 10 ml. of thionyl chloride was slowly added, with shaking, to the cooled solution. The reaction appeared to be mildly exothermic. The phosphine oxide thus formed was almost immediately chlorinated by $S_2Cl_2$ formed or the excess $SOCl_2$ present. The mixture of solvent and yellow crystals which separated was refluxed for one hour. After allowing the reaction mixture to cool to room temperature, the solid which formed was filtered off. Upon washing the solid with benzene and vacuum drying, there was obtained 7.37 g. (93.8% theory) of dichloro dimethylphenylphosphorane, M.P. 173.9–176° C. (sinters at 115° C.). It was completely soluble in chloroform, and recrystallization from this solvent gave large, colorless cubic crystals. The dichlorodimethylphenylphosphorane was converted to dimethylphosphine oxide by hydrolyzing with water, removing HCl with an in exchange resin and evaporating to dryness.

*Example 3*

To an ice-cooled flask containing a solution of 12.1 g. of dimethylphosphinothioic chloride in 35 ml. of benzene there was gradually added, with shaking, 15 ml. or thionyl chloride. The resulting solution was refluxed for 1.5 hrs. and then distilled to give 9.2 g. (86.7% yield) of dimethylphosphinic chloride, B.P. 115–118° C./52 mm., which solidified upon attaining room temperature.

What we claim is:

1. The method which comprises reacting, in the presence of an inert diluent, a trihydrocarbylphosphine sulfide wherein the hydrocarbyl radical is free of aliphatic unsaturation and contains from 1 to 8 carbon atoms, with thionyl chloride and removing from the resulting reaction products a trihydrocarbylphosphine oxide wherein the hydrocarbyl radical is as herein defined.

2. The method which comprises reacting triphenylphosphine sulfide, in the presence of an inert diluent, with thionyl chloride and recovering triphenylphosphine oxide from the resulting reaction product.

3. The method which comprises reacting dimethylphenylphosphine sulfide with thionyl chloride to obtain a reaction product comprising dichlorodimethylphenylphosphorane and mixing said product with water to obtain dimethylphenylphosphine oxide.

References Cited in the file of this patent

FOREIGN PATENTS 1,056,606    Germany _____ May 6, 1959

OTHER REFERENCES

Ishikawa: S. Chem. Abstracts, vol. 22 (1928), p. 1581.
Van Wazer: Phosphorus and Its Compounds, pp. 307-8, vol. 1 (1958).

UNITED STATES PATENT OFFICE

CERTIFICATE OF CORRECTION

Patent No. 3,082,256                                            March 19, 1963

Harold James Harwood et al.

It is hereby certified that error appears in the above numbered patent requiring correction and that the said Letters Patent should read as corrected below.

Column 3, line 65, for "is", first occurrence, read -- if --.

Signed and sealed this 25th day of February 1964.

(SEAL)
Attest:
ERNEST W. SWIDER                                     EDWIN L. REYNOLDS Attesting Officer                                Acting Commissioner of Patents